United States Patent [19]
Brandt et al.

[11] Patent Number: 6,132,784
[45] Date of Patent: Oct. 17, 2000

[54] METHOD AND APPARATUS FOR A UV LIGHT DISINFECTION SYSTEM

[75] Inventors: Dana J. Brandt; Chris A. Klebaum, both of Wapato, Wash.

[73] Assignee: E. W. Brandt & Sons, Inc., Parker, Wash.

[21] Appl. No.: 09/253,225

[22] Filed: Feb. 19, 1999

[51] Int. Cl.[7] .................. A23C 9/14; A23L 3/00; B01J 19/08
[52] U.S. Cl. .............. 426/248; 426/519; 426/521; 422/186.3; 422/24; 99/451
[58] Field of Search .................. 426/241, 519, 426/521, 248; 422/186.3, 24; 99/451

[56] References Cited

U.S. PATENT DOCUMENTS

| | | | |
|---|---|---|---|
| 2,364,049 | 12/1944 | Bensel | 426/248 |
| 4,776,267 | 10/1988 | Harris | 99/451 |
| 4,871,559 | 10/1989 | Dunn et al. | 426/248 |
| 5,364,645 | 11/1994 | Lagunanas-Solar et al. | 426/248 |
| 5,489,442 | 2/1996 | Dunn et al. | 426/248 |
| 5,614,151 | 3/1997 | LeVay et al. | 422/24 |

OTHER PUBLICATIONS

Aquionics, Inc. brochure, "The Use of UV Light in Horticulture," Mar. 1994.
Aquionics, Inc. manual, "Installation, Operating, and Maintenance Manual, Surface UV Disinfection Unit with Separate Pneumatics," Jul. 13, 1995.

*Primary Examiner*—Nina Bhat
*Attorney, Agent, or Firm*—Stratton Ballew PLLC

[57] ABSTRACT

An ultraviolet (UV) light disinfection method and apparatus is provided that disinfects produce products such as fruits and vegetables by direct exposure to ultraviolet light. The disinfecting UV light eliminates pathogens, such as molds and bacteria from the surfaces that it illuminates. The produce product is disinfected over its entire surface. The produce product can be rotated on a conveyor, to illuminate all of the exterior surface of the produce product with a disinfecting UV light source. To better respond to produce products of varying height and size, the UV light disinfection apparatus can include an automatic actuator. The automatic actuator maintains the UV light source at a preselected level of separation between the produce product and the UV light source. The automatic actuator is responsive to a height sensor that detects the top height of the produce product.

10 Claims, 6 Drawing Sheets

METHOD AND APPARATUS FOR A UV LIGHT DISINFECTION SYSTEM

TECHNICAL FIELD

The invention relates to a method and apparatus for an ultraviolet light disinfection system, and more particularly to a disinfection apparatus for a produce product, utilizing ultraviolet light.

BACKGROUND OF THE INVENTION

Disinfection with ultraviolet (UV) light can dramatically increase the storage and shelf life of many manufactured products. Extending shelflife by a safe and relatively inexpensive process allows the manufacturers of these products to reduce the use of chemical preservatives and disinfectants. UV light disinfection systems offer the advantage of lower operation costs as compared with conventional chemical additives and cleaning agents. UV light disinfection systems are utilized in many industries as an environmentally safe and regulation free method of sterilization. Additionally, UV disinfection systems are free from consumer or environmental concerns that are often voiced regarding conventional chemical disinfection methods. UV disinfection systems have been used successfully in many drinking and process water applications, and in hospitals, pharmaceutical and beverage production.

Bacteria, molds and viruses substantially absorb UV wavelengths of 210 nm and 310 nm. It is understood that this absorbed UV radiation adversely affects the survivability of many pathogens, such as bacteria, molds and viruses. Standard, commercially available UV lamps can efficiently emit a broad germicidal spectrum that includes these specific wavelengths of UV light, and in the intensity required for effective control. A UV dose of approximately 0.1 joules/$cm^2$ is considered effective in controlling these pathogens. Disinfection is a term that is typically employed to describe the elimination of substantially all pathogens with very few survivors, while the term sterilization is employed to describe the total elimination of all pathogens, without any survivors.

UV light has also been utilized to disinfect the surfaces of packages. A wrapped or enveloped product is subjected to a UV light source to control potential contamination on the surface of the packaging. Conventional packaging lines equipped with surface UV disinfection equipment often include a photoelectric interlock. The photoelectric interlock includes a photoelectric sensor that detects the presence of a package or carton in proximity to the UV lamp on a process line. The UV lamp is mounted to a fixed frame, typically above the process line. When enabled by the photo electric interlock, the UV lamp illuminates the package as it passes beneath and so sterilizes the top facing surfaces of the package.

A problem occurs when the package has surfaces that require disinfection but these surfaces do not face the UV lamp as the package passes the UV lamp. Additional passes under the UV lamp must be made to illuminate the other surfaces of the package. This single surface disinfection may be acceptable for flat, roughly two sided packaging, but is typically not acceptable for multi-sided packages.

An additional problem occurs if it is desired to sterilize containers of various sizes. In practice, the process line is configured to handle only one size of a container. The process line must be shut down and reconfigured to compensate for any change in distance from the UV lamp to the carton.

Produce products, such as fruits and vegetables, are washed and typically scrubbed before packing into boxes. Typically, clean, sterilized or at least substantially disinfected water must be utilized to wash the produce product to minimize the introduction of molds and bacteria onto the produce product. Ultraviolet light treatment of the wash water is employed to provide assurance that the wash water is pure and clean.

Additionally, when brushes are used to scrub, dry or polish the produce product, the brushes themselves can become contaminated with molds or bacteria and serve to spread the contamination to much of the produce that passes through the brushes. This problem makes storing the packed fruit difficult, because a single contaminated piece of produce product can ruin an entire box of packed produce in a short period. A method and apparatus that cleans produce products without the use of water as a final cleaning and disinfecting step is needed.

SUMMARY OF INVENTION

The present invention provides an ultraviolet light disinfection method and apparatus. The invention includes an ultra violet light source that provides a disinfecting illumination of a produce product. A conveyor can be utilized to receive the produce product and move the produce product into proximity of the ultraviolet light source. The conveyor includes at least a single roller. The roller rotates the produce product in relation to the ultraviolet light source. The action of the roller presents substantially the entire surface of the produce product to the disinfecting illumination of the ultraviolet light source.

To better respond to produce products of varying height and size, the ultraviolet light sterilization apparatus can include an automatic actuator. The automatic actuator maintains the ultraviolet light source at a preselected level of separation between the produce product and the ultraviolet light source. The automatic actuator is responsive to a height sensor. The height sensor detects the top height of the produce product, and so, with input from the height sensor, the automatic actuator is maintained above the produce product at the preselected level.

The method of the invention includes first moving the produce product into a proximity of an ultraviolet light source. The ultraviolet light source illuminates the exterior surface of the produce product. The product can be rotated to illuminate substantially the entire exterior surface of the produce product.

As an additional alternative method step, a top height of the produce product is detected so that the ultraviolet light source can be maintained at a predetermined level above the top height of the produce product.

According to one aspect of the invention, a produce product is disinfected by direct exposure to ultraviolet light. Conventional disinfecting methods for produce products, such as fruits and vegetables consisted of washing the produce products with either sterilized or disinfected water, rather than direct ultra violet disinfection.

According to a related advantage of the present invention, ultraviolet light is employed to disinfect, or alternatively sterilize, the surface of a produce product without the use of water or potentially contaminated brushes.

According to another aspect of the invention, the produce product is disinfected over its entire surface. The invention includes rotating the produce product as it is disinfect, to illuminate all of the exterior surface of the produce product with an ultraviolet lamp.

According to yet another aspect of the invention, produce products of various sizes can be adequately disinfected without stopping and re-configuring the process line.

DETAILED DESCRIPTION OF SPECIFIC EMBODIMENTS

The present invention provides an ultraviolet light disinfection apparatus 10, as illustrated in FIGS. 1 through 6, which is specifically configured to disinfect a produce product 11. As detailed in FIG. 1, the ultraviolet light disinfection apparatus includes an ultraviolet light source 12 positioned above a conveyor 13.

Figure 4:
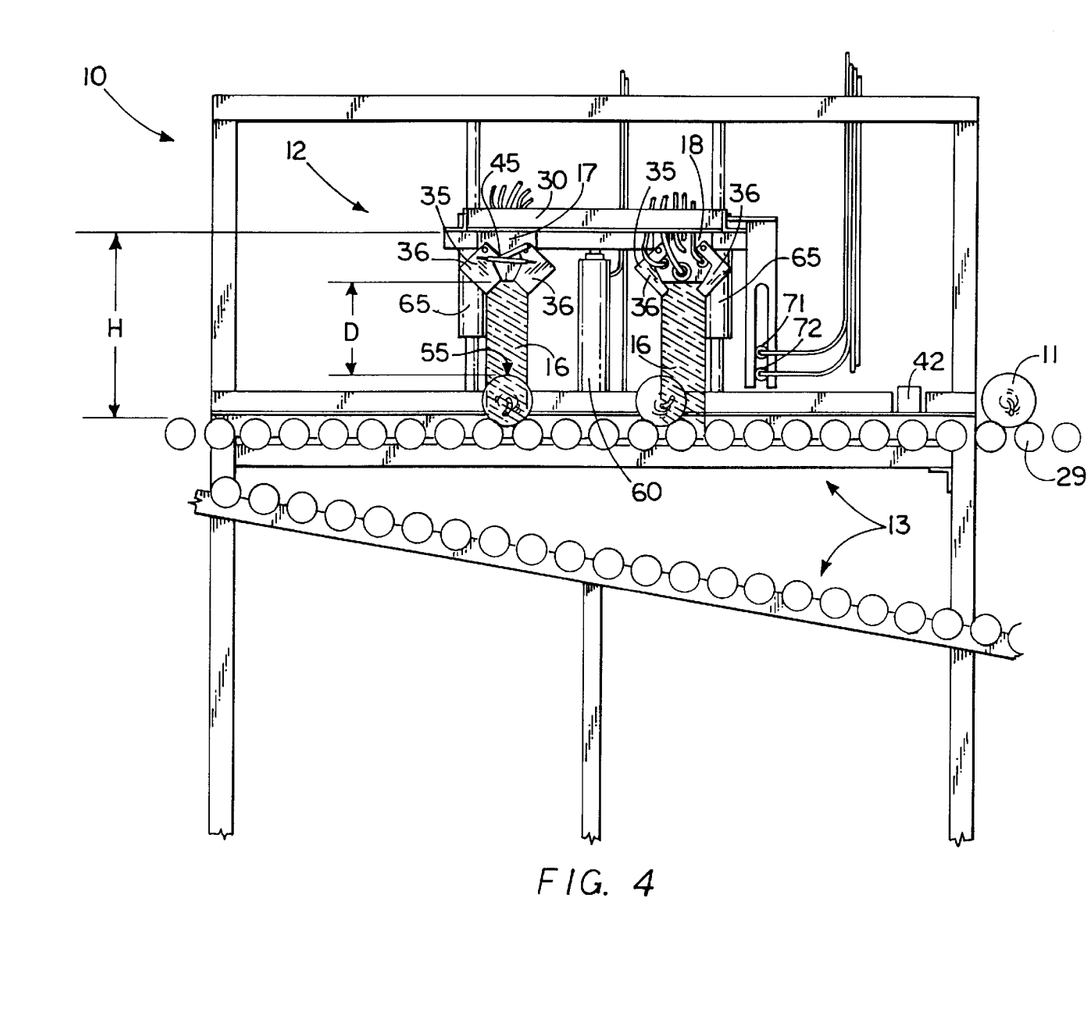
FIG. 4 is a partial side elevational diagram of an ultraviolet light disinfection apparatus for a produce product, according to an embodiment of the present invention.
Figure 5:
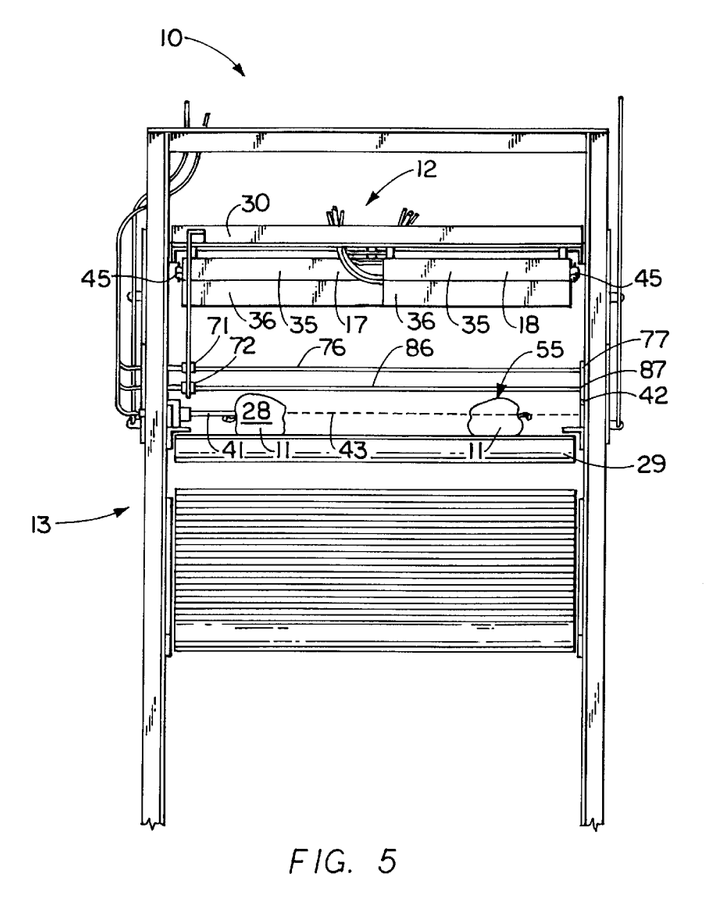
FIG. 5 is an end elevational diagram of an ultraviolet light disinfection apparatus for a produce product, according to an embodiment of the present invention.
Figure 6:
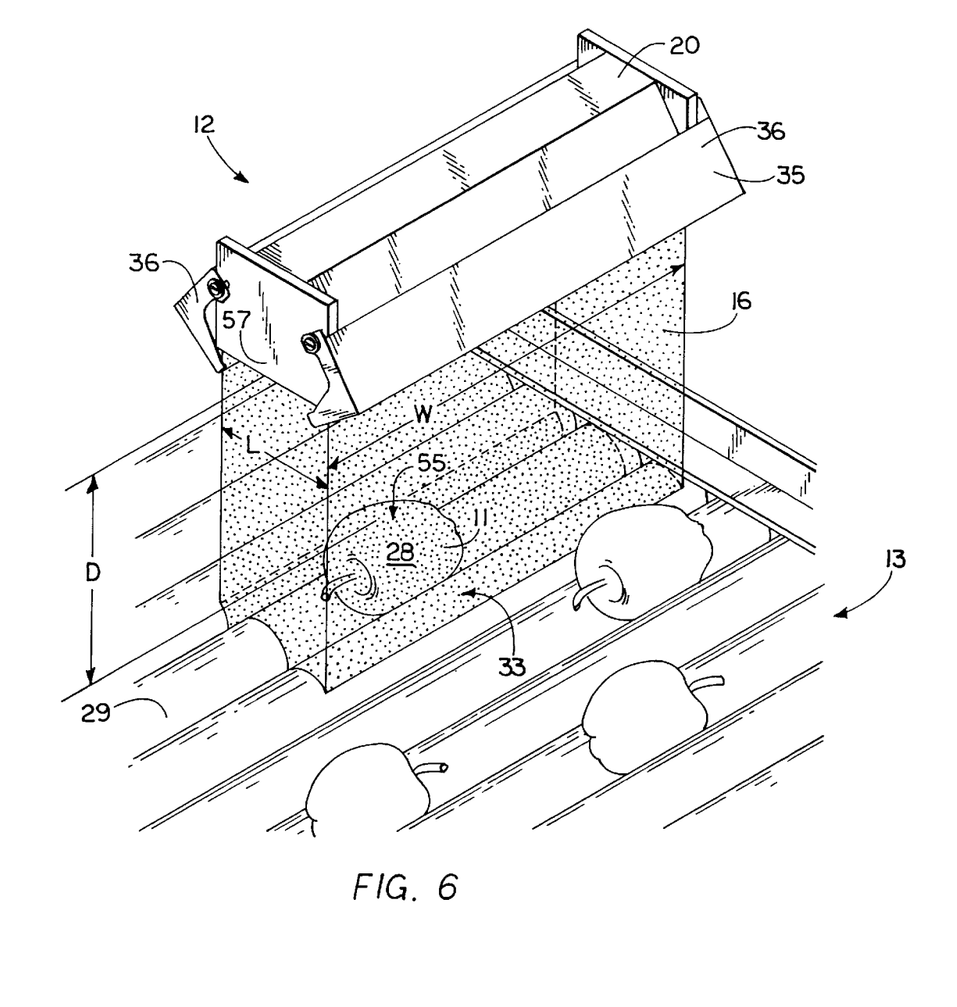
FIG. 6 is a partial perspective diagram of an ultraviolet light disinfection apparatus for a produce product, according to an embodiment of the present invention.

The conveyor 13 presents a produce product 11 to the ultraviolet light source 12. In a preferred embodiment, as illustrated in FIGS. 1 through 6, apples are a preferred produce product conveyed beneath an ultraviolet light 16 emitted by the ultraviolet light source, as illustrated in FIG. 6. However, as discussed further herein, a wide variety of produce products can be successfully processed with the present invention.

For the purposes of this detailed description, the term "ultraviolet" will be hereinafter abbreviated to UV. As shown in the FIGS. 1 through 6, the UV light source 12 preferably includes a first UV light source 17 paired with a second UV light source 18 to fully illuminate the conveyor 13 with the UV light 16. This preferred, paired configuration, the first UV light source and the second UV light source are needed to provide adequate UV light coverage for the entire width of the conveyor 13. A single UV light source or multiple UV light sources can be employed as alternatives, depending on the requirements of a particular configuration of conveyor and UV light source.

As shown in FIGS. 1 through 5, the first UV light source 17 and the second UV light source 18 each preferably include a disinfection head 20 that houses an arc tube lamp (not shown), within. A most preferred UV light source 12 is a "Surface UV Disinfection Unit," model "XL-10," as manufactured by aquanics, inc. of Erlanger, Ky., USA. The model XL-10 unit is rated to produce approximately 2 kW of UV light in wavelengths substantially in the range of 200 nm to 300 nm. However, any of the disinfection units in the XL series as manufactured by aquanics, inc., or an equivalent UV disinfection device manufactured by aquanics, inc. or another manufacturer can be utilized in the present invention.

Determining the required intensity or power of the UV light source 12 is first based upon the dosage of the UV light 16 required to achieve a desired level of surface disinfection for a particular produce product 11. The present invention is specifically tailored to disinfect an exterior surface 28 of the produce product. Produce products are herein defined as a farm, orchard, vineyard, greenhouse, or similarly grown product. These produce products all have exterior surfaces that can harbor pathogens, such as bacteria and molds. These pathogens, although typically quite benign at low levels, can multiply rapidly to spoil the produce product. This is especially true if the exterior surface of the produce product includes a bruise, cut or abrasion, which can act as a site for bacterial growth.

Until the present invention, produce products, such as fruits and vegetables, have only been washed with clean or sterilized water, and a common method for the sterilization or disinfection of the water involved directing UV light into it. However, the brushes and scrubbers employed for water application can themselves become contaminated and spread pathogens to entire lots of the produce product. The present invention disinfects the produce product without contacting it with a potentially contaminated brush or applicator.

Additionally, the exterior surfaces of a packaged product, such as plastic containers, cups, caps, films and foils have all been directly disinfected with UV light on a bulk or mass manufacturing level. However, until the present invention, the direct UV light disinfection of fruits and vegetables was not recommended, or feasible. This inability to disinfect these produce products with surface UV light disinfection was primarily due to the dosage inconsistencies that result from size variations in the produce product. Additionally, because produce products are typically round and opaque, they are prevented them from receiving total surface illumination from a single, stationary source of UV light. The present invention efficiently disinfects the exterior surface 28 of the produce product with a disinfecting illumination that employs efficient and environmentally safe UV light 16. By utilizing the conveyor 13 to rotate the produce product 11 as it passes the UV light source 12, the conveyor moves the produce product into a proximity of the UV light source.

As illustrated in FIGS. 1 through 5, the conveyor 13 preferably includes a plurality of rollers 29. The plurality of rollers operate together to rotate the produce product 11 in relation to the UV light source 12 and so present substantially all of the exterior surface 28 of the produce product to provide a disinfecting illumination of the UV light 16 by the UV light source 12, as detailed in FIG. 6. Alternatively, a single roller on the conveyor could be utilized to individually rotate the produce product as it passes the UV light source. More preferably, the plurality of rollers with each roller having the capability to rotate is utilized to rotate the produce product in the present invention. The rotation of an individual roller, or of multiple adjacent rollers could be activated as the rollers enter the proximity of the UV light source. Most preferably the conveyor is a continuous belt conveyor with regularly spaced rollers, each receiving a single row of produce product, and all of the rollers of the conveyor actively rotate as the produce product is moved by the conveyor. The rotating rollers cause the produce product to rotate in the opposite direction that the rollers rotate, thereby exposing substantially the entire exterior surface 28 of the produce product to the UV light, which is directed down onto the produce product from above.

Additionally, by utilizing a floating frame 30, as shown in FIGS. 1 through 5, the UV light source 12 can be raised or lowered in response to changes in the size of the produce product 11. The disinfecting illumination of the UV light source quickly diminishes as a function of increasing distance from the UV light source. A dose of the UV light 16 to the exterior surface 28 of the produce product of approximately 0.1 joules/cm$^2$ is considered an effective dosage for the control of pathogens. However, as the produce product is rotated, only a half of its exterior surface is exposed to the downward directed UV light at any given moment. Therefore, if the produce product is fully rotated as it passes under the UV light source, substantially exposing the entire produce product to the UV light source as it rotates, a rotational exposure factor of approximately one-half results. A residence time for optimal disinfection can then be calculated, based upon the distance between the UV light source and the produce product, the power of the UV light source, the rotational exposure factor and the required dosage. Finally, the residence time can be utilized to determine an ideal speed for the conveyor 13 and an ideal rotational speed for the rollers 29 of the conveyor, as they pass through a length L of disinfecting illumination, as shown in FIG. 6.

The UV light 16 from the UV light source 12 is preferably constrained to specific boundaries. By confining the UV light to a specific area of the conveyor 13, the variations in intensity as a function of distance from the UV light source are minimized and therefore the dosage rate is substantially consistent for produce product 11 positioned at any point on the conveyor that is illuminated beneath the UV light source. The UV light is preferably constrained, as shown in FIG. 6, to an area of illumination 33 having the length L, and a width W.

To limit partial illumination and inadvertent or wasteful lighting from the UV light source 12, each disinfection head 20 is preferably equipped with an automatic shutter 35, as shown in FIGS. 1, 3, 4, 5 and 6. The automatic shutter is a light blocking shutter and preferably includes a pair of doors 36 that hingeably attach to the disinfection head of the first UV light source 17 and the second UV light source 18. The automatic shutters are preferably controlled by a shutter transceiver 40. The shutter transceiver is placed proximate the conveyor 13, preferably proximate to and immediately adjacent to the conveyor and before the UV light source, as shown in FIGS. 1 through 5.

In the preferred embodiment, the shutter transceiver 40 projects a shutter beam of light 41 across the conveyor 13 and onto a shutter reflector 42. The shutter reflector then reflects the shutter beam of light back to the shutter transceiver to complete a shutter beam path 43. When the shutter beam path is free of produce product 11 for a preset minimum length of time, the doors 36 of the automatic shutter 35 are closed, as shown in FIG. 3. The shutter beam path is preferably horizontal and substantially perpendicular to the conveyor's direction of movement. When the shutter beam path is blocked by the produce product, as shown in FIGS. 1, 2, 4 and 5, the shutter transceiver has detected the presence of the produce product on the conveyor approaching the UV light source 12. The shutter transceiver is interlocked with the operation of the light blocking, automatic shutter 35 that is affixed to the UV light source. A shutter actuator 45, as shown in FIGS. 1, 3, 4, and 5, opens the automatic shutter in response to the shutter transceiver's signal and the conveyor is illuminated by the UV light 16 in preparation for receiving the produce product into the area of illumination 33, a detailed in FIG. 6.

The distance between the produce product 11 and the UV light source 12 is critical in calculating the produce product's optimum residence time in the area of illumination 33, and in determining the desired speed of the conveyor 13. Preferably, the produce product is substantially spherical, as in the instance of apples. A substantially spherical produce product allows the rollers 29 to fully rotate the produce product within the area of illumination, beneath the UV light source. The highest surface point of the produce product, which could also be described as the upper surface limit of the produce product, is herein defined as a top height 55, as shown in FIGS. 4, 5 and 6. The disinfection head 20 of the UV light source has a base 57, also detailed in FIG. 6, which is located near the lowest point of the disinfection head, closely proximate to the lens (not shown). The lens directs the light from the UV lamp, vertically downward toward the conveyor. A separation distance D is herein defined as the distance between the top height of the produce product and the base of the disinfection head. Any reasonable separation distance can be selected. However, an optimal separation distance is approximately 6 inches to 9 inches for the preferred UV light source, as described above and employed with the present invention. At this optimal separation distance, the preferred nominal 2 kW UV light source can deliver the desired approximate 0.1 joules/cm$^2$ dosage of UV light 16 to the produce product in less than one second. At a preferred separation distance of approximately 6 to 8 inches, the desired dosage of UV light from a nominal 2 kW light, as specified above, can be obtained in approximately 0.2 to 0.6 seconds and includes the rotational factor, which compensates the exposure for rotation of the produce product by the rollers 29 of the conveyor 13. Most preferably, the desired dosage of UV light from a nominal 2 kW light, as specified above, can be obtained in approximately 0.4 seconds at the most desired separation distance of 7 inches.

Alternatively, with higher UV dosages, sterilization of the exterior surface 28 of the produce product 11 can be achieved, rather than disinfection. These higher dosages of UV light 16 can readily be achieved in several ways, to substantially sterilize the exterior surface of the produce product. The conveyor speed can be reduced, the intensity of the UV light source 12 can be increased and the separation distance D can be reduced.

It is desirable to maintain the UV light source 12 at the optimum, preselected, separation distance D above the produce product 11. This separation distance from the produce product requires raising the floating frame 30 from the conveyor 13 to a frame height H, as shown in FIG. 4. The frame height must account for of size variations in the produce product. If the UV light source is positioned in relation to a large diameter produce product, a produce product of a smaller diameter may be too far from the UV light source. Conversely, a large diameter produce product may be over illuminated or burned by the UV light 16, if the UV light source is positioned in relation to a smaller diameter produce product.

If the produce product 11 is uniformly sized, the frame height H above the conveyor 13 does not change. As an alternative, for consistently sized produce product, the UV light source 12 can be mounted above the conveyor in an immobile position. Additionally, if the size of the produce product only changes periodically, as it might at the beginning of a particular lot or run of consistently sized produce product, the UV light source can be maintained by at a manually adjusted frame height and periodically re-adjusted after a measurement of the separation distance D is taken and the appropriate adjustment to the frame height made.

However, if the size of the produce product 11 is not consistent during a run of the produce product, as is most often the case, the preselected frame height H must be raised or lowered to maintain the required separation distance D. This is especially important when the produce product varies in size from lot to lot processed. In the tree fruit industry, for example, the size of fruit can vary considerably from tree to tree, bin to bin, orchard block to orchard block and especially from grower to grower. Despite fruit size variations, the UV light source 12 must maintain the separation distance at a substantially constant value in response to the size variations of the produce product.

Preferably, an automatic actuator 60 is utilized for moving the UV light source 12 to the separation distance D, above the produce product. As shown in FIGS. 2, and 3, the automatic actuator attaches to the floating frame 30 that preferably includes the first UV light source 17, and the second UV light source 18, each of which includes the disinfection head 20, attached to the floating frame.

Figure 1:
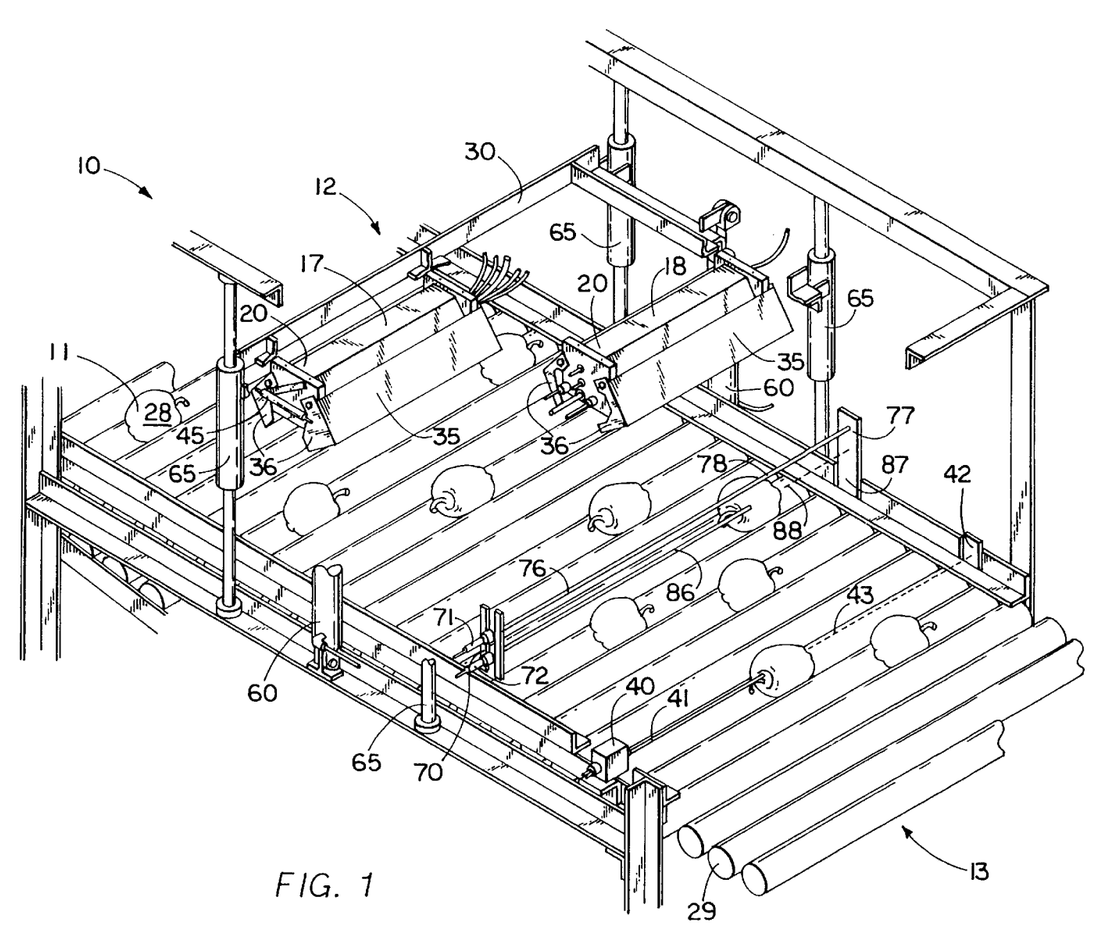
FIG. 1 is a perspective diagram of an ultraviolet light disinfection apparatus for a produce product, according to an embodiment of the present invention.
Figure 2:
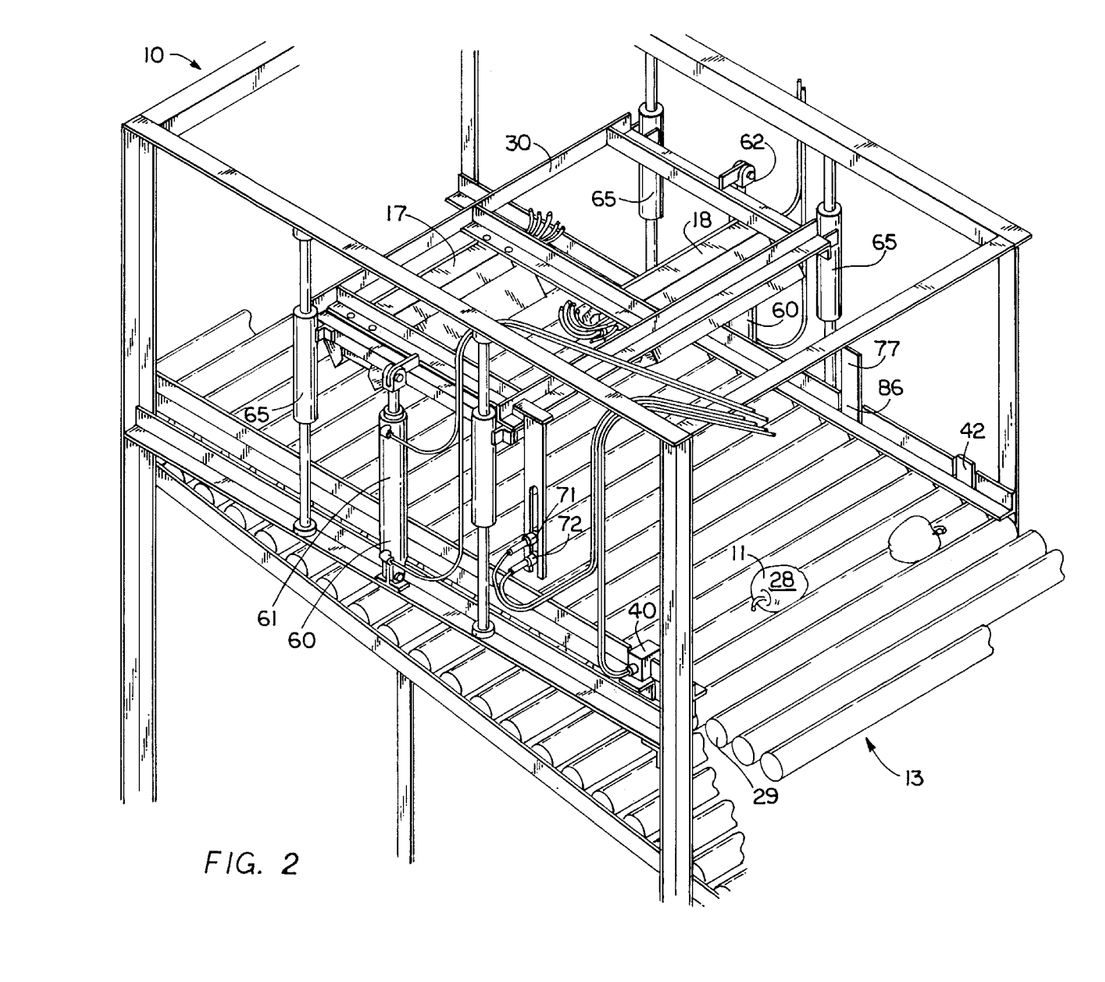
FIG. 2 is a perspective diagram of an ultraviolet light disinfection apparatus for a produce product, according to an embodiment of the present invention.
Figure 3:
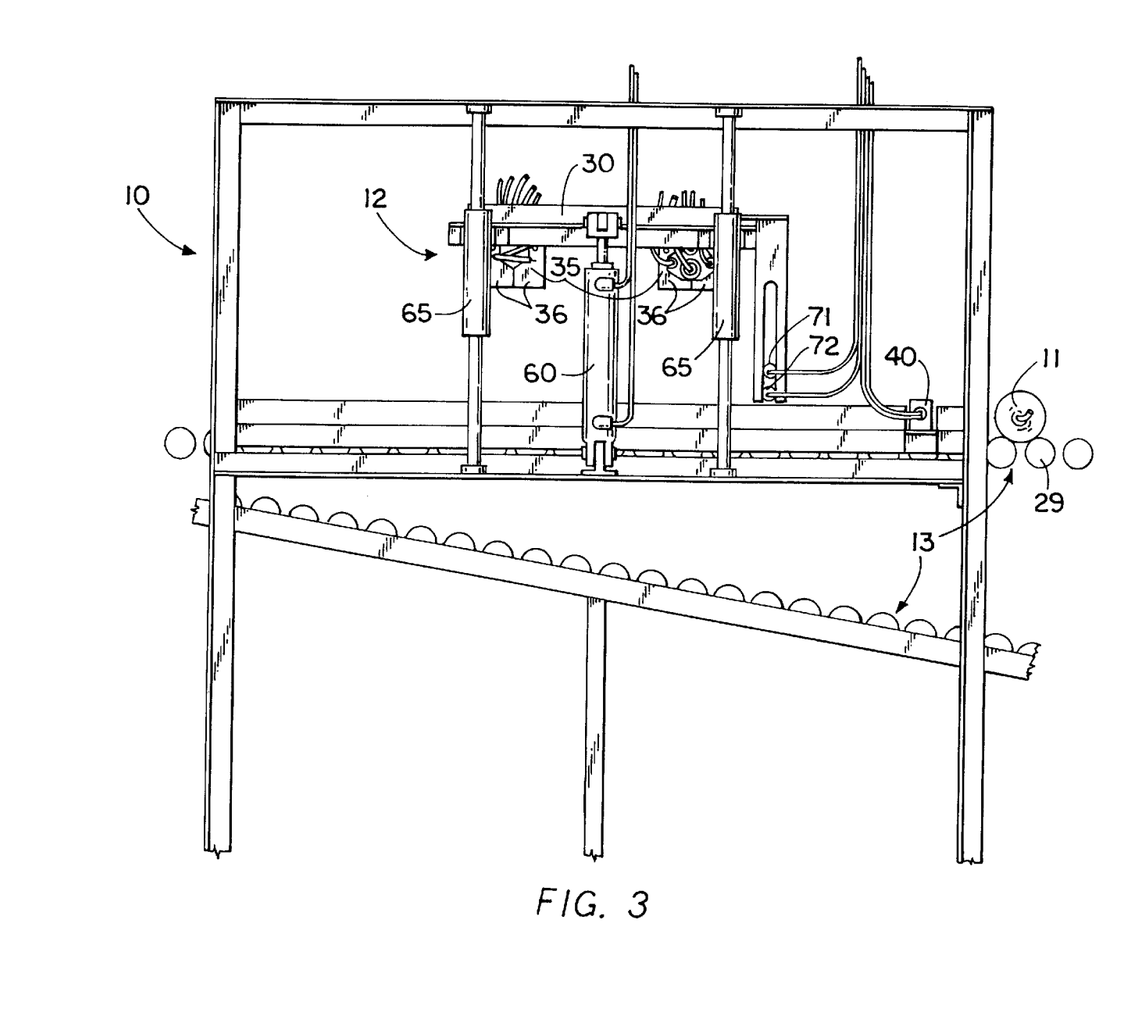
FIG. 3 is a side elevational diagram of an ultraviolet light disinfection apparatus for a produce product, according to an embodiment of the present invention.

Most preferably, the actuator 60 is a pair of actuators, namely a first actuator 61 and a second actuator 62, as shown in FIGS. 1 and 2. The first actuator and the second actuator are preferably positioned on opposing sides of the floating frame 30 and at opposing sides of the conveyor 13, to provide a balanced movement in raising or lowering the floating frame. Most preferably, the first actuator and the second actuator are pneumatically powered pistons, automatically controlled to maintain the frame and the attached UV light source 12 at the separation distance D above the top height 55 of the produce product. To aid in the smooth operational movement of the floating frame, a cushioning sleeve 65 is preferably installed at each corner of the floating frame, as illustrated in FIGS. 1 and 2. Alternatively, the actuator 60 may be any conventional mechanical actuator that has the ability to extend and retract in response to electrical control signals. A hydraulic actuator and a screw drive are adequate alternatives to the preferred pneumatic actuator. In a preferred embodiment of the present invention, a pneumatic cylinder actuator is utilized, which is most preferably a model typified by the DWC-176-2 cylinder as manufactured by bimba manufacturing co., of Monee, Ill.

To control the action of the actuator 60, a height sensor 70 is employed to detect the top height 55 of the produce product 11. The height sensor is controls a typical pneumatic solenoid valve to thereby control the actuator. Most preferably a 82 series, 2-position solenoid valve as manufactured by mac®valves, inc., of Wixom, Mich., are utilized. Preferably, as shown in FIGS. 1 through 5, the height sensor is actually two, separate transceivers. An upper transceiver 71 is preferably positioned immediately above a lower transceiver 72. The upper transceiver unit emits an upper light beam 76, which is preferably a weak laser or a focused light beam, on an upper reflector 77. The upper reflector is preferably positioned horizontally, across the conveyor 13 from the upper transceiver. The upper reflector then reflects the upper beam of light back to the upper transceiver to complete an upper beam path 78. The upper transceiver can receive and sense the reflection of its own emitted upper light beam. The lower transceiver emits a lower light beam 86. Like the upper light beam, the lower light beam is also preferably a weak laser or a focused beam of light. The lower light beam is directed horizontally, to a lower reflector 87, which is also positioned proximate the opposite side of the conveyor, preferably positioned immediately below the upper reflector. The lower reflector then reflects the lower beam of light back to the lower transceiver to complete a lower beam path 88. The upper beam path and the lower beam path are detailed in FIG. 5.

In a preferred embodiment of the present invention, the transceiver units employed for the height sensor 70 are preferably retro-reflective sensors, as manufactured by balluff, inc., of Florence, Ky., and specifically the BOS-S5-5-A2-32 model photoelectric sensor. This preferred transceiver utilizes a polarized infra-red LED emitter. A similar transceiver, preferably a block style optical sensor, of the BOS 35K series, also manufactured by balluff, inc., of Florence, Ky., is utilized for the shutter transceiver 40.

The height sensor 70 detects the proximate upper height 55 of the produce product 11 through the raising or lowering of the floating frame 30, to which the height sensor is attached. The upper transceiver 71 and the lower transceiver 72 together operate to detect the upper height of the produce product. When both the upper beam path 78 and the lower beam path 88 are blocked by the produce product, as the produce product passes by on the conveyor 13, a raising signal is sent to the actuator 60 to raise the floating frame an incremental distance. However, if both the upper beam and the lower beam remain unblocked, even though the shutter transceiver 40 currently detects the presence of produce product on the conveyor 13, a lowering signal is sent to the actuator to lower the floating frame. If the upper beam path is unblocked and the lower beam path is blocked, as detailed in FIG. 5, the actuator is neither raised nor lowered because the floating frame, with its attached UV light source 12, is approximately at the proper frame height H to maintain the desired separation distance D.

As an alternative to the fixed mounting of the UV light source 12 on the floating frame 30, the UV light source can be mounted to travel side to side in the floating frame, thereby enabling a single UV light to sweep the entire illumination area 16, from one side edge of the conveyor 13 to the other. This alternative is considered less desirable in that the conventional UV light source is easily damaged by vibration and jarring. The actuators 60 of the present invention smoothly raise and lower the UV light in a fixed position relative to the floating frame, thereby minimizing vibration and jarring of the lamps within the UV light source.

The method of the present invention includes a step-wise process for the surface disinfection of the produce product 11 with UV light 16. First, the produce product is moved into proximity of the UV light source 12. This movement of the produce product is accomplished by the conveyor 13, as previously described. When in proximity of the UV light, the exterior surface 28 of the produce product is illuminated. The amount of illumination can depend on a variety of factors, which include: the desired dose of UV light that will achieve the level of disinfection needed for the particular produce; the intensity of the UV light source; the speed of the conveyor; and the distance from the UV light source to the produce product.

The produce product 11 can be rotated beneath the UV light source 12 to illuminate substantially all of the exterior surface 28 of the produce product. This is preferably achieved by rotating the rollers 29 of the conveyer to roll or rotate the produce product as it passes through the UV light 16. The exterior surface of the produce product is thereby disinfected as the produce product is rotated by the conveyor and illuminated by the UV light source.

To aid in maintaining the UV light source 12 at a proper height H above the produce product 11, the method of the present invention can include the steps of detecting the top height 55 of the produce product. The detected top height is utilized to maintain the UV light source at a predetermined level above the top height of the produce product.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited, except by the following claims, as appropriately interpreted in accordance with the doctrine of equivalents.

What is claimed is:

1. An ultraviolet light disinfection apparatus for disinfecting an exterior surface of a produce product comprising:

a produce product having an exterior surface;

an ultraviolet light source for providing a disinfecting illumination with an ultraviolet light, to the exterior surface of the produce product;

a conveyor for moving the produce product into proximity of the ultraviolet light source, the conveyor including a minimum of a roller, the roller for rotating the produce product in relation to the ultraviolet light source, and the roller for presenting to the ultraviolet light source, to substantially disinfect all of the exterior surface of the produce product with the ultraviolet light;

an automatic actuator for moving the ultraviolet list source to a preselected level above the produce product;

the produce product having an upper surface limit, and the preselected level defined as a position of the ultraviolet light source that results in a desired separation distance between the surface limit of the produce product and the ultraviolet light source; and a height sensor for detecting the top height surface limit of the produce product, the automatic actuator responsive to the height sensor.

2. The ultraviolet light disinfection apparatus of claim 1, wherein the ultraviolet light source substantially sterilizes all of the exterior surface of the produce product with the ultraviolet light.

3. The ultraviolet light disinfection apparatus of claim 1, additionally comprising:

a shutter sensor for detecting the presence of the produce product as the produce product approaches the ultraviolet light source, the shutter sensor interlocked with the operation of a light blocking shutter affixed to the ultraviolet light source.

4. The ultraviolet light sterilization apparatus of claim 1, wherein the produce product is an apple.

5. The ultraviolet light disinfection apparatus of claim 4, wherein the conveyer additionally comprises a minimum of a roller, the roller for rotating the produce product in relation to the ultraviolet light source, and the roller for presenting substantially all of the exterior surface of the produce product to the disinfecting illumination by the ultraviolet light source.

6. An ultraviolet light disinfection apparatus for a produce product comprising:

an ultraviolet light source for a disinfecting illumination of a produce product;

a conveyor for receiving the produce product, the conveyor for moving the produce product into a proximity of the ultraviolet light source;

an automatic actuator for maintaining the ultraviolet light source at a predetermined level, the produce product having a top height and the predetermined level defined by a separation distance between the top height and the ultraviolet light source; and a height sensor for detecting the top height of the produce product, the automatic actuator responsive to the height sensor to maintain the ultraviolet light source at the predetermined level.

7. The ultraviolet light disinfection apparatus of claim 6, wherein the produce product is an apple.

8. A process for an ultraviolet light disinfection of a produce product comprising the steps of:

a) moving a produce product into proximity of an ultraviolet light source;

b) illuminating an exterior surface of the produce product with an ultraviolet light from the ultraviolet light source;

c) rotating the produce product to illuminate substantially all of the exterior surface of the produce product;

d) disinfecting the exterior surface of the produce product as the produce product is rotated and illuminated by the ultraviolet light source;

e) detecting a top height of the produce product; and f) maintaining the ultraviolet light source at a preselected level above the top height of the produce product.

9. A process for an ultraviolet light disinfection of a produce product comprising the steps of:

a) moving a produce product into a proximity of an ultraviolet light source;

b) detecting a top height of the produce product;

c) maintaining the ultraviolet light source at a preselected level above the top height of the produce product; and d) illuminating and disinfecting the produce product.

10. The process of claim 9, additionally comprising the steps of:

e) rotating the produce product to illuminate substantially all of an exterior surface of the produce product; and f) disinfecting the exterior surface of the produce product as the produce product is rotated and illuminated by the ultraviolet light source.

* * * * *

UNITED STATES PATENT AND TRADEMARK OFFICE
CERTIFICATE OF CORRECTION

PATENT NO. : 6,132,784
DATED : October 17, 2000
INVENTOR(S) : Dana J. Brandt, et. al.

It is certified that error appears in the above-identified patent and that said Letters Patent is hereby corrected as shown below:

At column 9, line 29, change "list" to --light--;

Signed and Sealed this

First Day of May, 2001

Attest:

NICHOLAS P. GODICI

Attesting Officer

Acting Director of the United States Patent and Trademark Office